Patented Nov. 16, 1937

2,099,423

UNITED STATES PATENT OFFICE 2,099,423

COATING COMPOSITION

Gustave D. Fortman, Philadelphia, Pa.

No Drawing. Application January 28, 1936
Serial No. 61,178

2 Claims. (Cl. 134—46)

This invention relates to a coating composition and in particular to a dry mixture which on the addition of water, shellac, paint, or other liquid carrier is ready to be applied as a coating to wood, paper, glass, cellophane, and many other surfaces. Coating compositions which have heretofore been proposed for such use are open to certain disadvantages. Some of these compositions show a tendency to crack after they have been applied to the surface to be coated. Others require a preliminary sizing of the surface to be coated. Many of them call for the use of hot water as a carrier, and this is a disadvantage in building construction because hot water is not readily available in such locations. A further disadvantage in some of these compositions is that the coating undergoes a change as it dries with the result that the color or texture, or both, of the dried, coated surface varies from the surface as it exists when the coating is first applied. Furthermore some coating compositions on drying form a crumbly, chalky surface. This invention affords a novel coating composition free from the disadvantages inherent in the prior compositions. In addition the subject of this invention has individual properties of advantage which are more fully specified below.

One object of this invention is to provide a coating composition which is easy to prepare.

Another object is to provide a coating composition which will not crack after application to the surface to be coated.

Another object of this invention is to provide a coating composition which may be prepared for use by the addition of cold water, shellac, paint, or the like.

A further object of the present invention is to provide a coating composition which will be free from objectionable odors.

Still another object of this invention is to provide a coating composition which may be allowed to stand in a container for a number of days after the addition of a carrier such as water, shellac, or the like without undergoing harmful changes.

Another object of this invention is to provide a coating composition which will dry in substantially the same form that it assumes upon application.

A still further object of this invention is to provide a coating composition which will give a firm surface on drying as distinguished from a chalky, crumbly surface.

Other objects and features of advantage will appear from the description of this invention which follows.

While the composition which is the subject of this invention is adapted particularly for application to walls and ceilings, it is to be understood that it may be used as a coating for a variety of other surfaces. In the manufacture of this coating composition the following ingredients are thoroughly mixed in an appropriate mixer for a period of approximately 20 minutes. It is to be understood that the following example is set forth merely as an illustration of one way in which this invention may be carried out.

|  | Lbs. |
|---|---|
| Whiting ($CaCO_3$) | 50 |
| Cold water paste (gluten from rye flour) | 1 |
| Powdered asbestos | 1 |

The amounts of the above ingredients may be varied where certain specific characteristics are desired. For instance, the cold water paste or the powdered asbestos or both may be used in amounts ranging from 1 to 5 lbs. for every 50 lbs. of whiting. After the above ingredients have been thoroughly mixed they are ready for packing. The dry mixture will keep indefinitely in this form.

In using this composition, water may be added in an amount to give a suitable consistency. It has been found that for ordinary purposes a suitable consistency is attained by adding water in volume equal to the volume of the dry mixture to be used. For some purposes shellac may be used as a carrier. It has been found that the best results are obtained when commercial shellac is cut with commercial ethanol. This cutting may be in the amount of one quart of ethanol to a gallon of commercial shellac, or in some instances as high as one quart of ethanol to one quart of commercial shellac. The cut shellac is then added to the dry mixture in approximately equal volumes. Ordinary paint may also be used as a carrier in which case one quart of paint is used to every two pounds of the dry mixture. This gives a composition which remains pliable after application but which takes on a surface hardness on prolonged exposure to the atmosphere. The consistency of the liquid composition depends upon the type of carrier used and upon the amount of carrier used. It is thus possible to prepare coating compositions which may be applied with a brush, with a trowel, or by spraying. It is also possible to obtain a consistency which makes it possible to enclose the finished coating composition in tubes or in closed containers.

Where the finished coating composition is put up in tubes or other closed containers, a compound such as lime, benzoic acid or the like is added to prevent the building up of pressure by the gradual evolution of gas. About 2% lime or 0.1% benzoic acid is sufficient for this purpose.

This coating composition, whether it be made with water, shellac, or other carrier, may be used without the addition of coloring matter in which case a substantially neutral effect is obtained. Where a solid color effect is desired, coloring matter in the form of either pigment or dyes may be added directly to the composition when the carrier is added. If a tinted surface is desired, a thin coat of shellac is applied to the finished and thoroughly dried coating. This application of shellac may be preceded by a slight sanding of the coated surface. Colors, as for instance oil colors, are mixed with a glazing material such as a drying flat oil and applied to the coated surface. After standing for about 20 minutes this surface is wiped down with a cloth. This leaves the smooth areas relatively light in color and the rough areas noticeably darker.

Having thus described my invention, I claim:

1. A dry mixture, adapted to be mixed with a liquid to form a coating composition, including the following ingredients in substantially the following proportions, 50 parts by weight of whiting, from 1 to 5 parts by weight of cold water paste, and from 1 to 5 parts by weight of powdered asbestos.

2. A liquid coating composition including the following ingredients in substantially the following proportions, 50 parts by weight of whiting, from 1 to 5 parts by weight of cold water paste, and from 1 to 5 parts by weight of powdered asbestos.

GUSTAVE D. FORTMAN.